United States Patent
Dollo et al.

(10) Patent No.: US 7,944,945 B2
(45) Date of Patent: May 17, 2011

(54) ENCAPSULATION OF STM-N/STS-M FRAMES UNDER ETHERNET

(75) Inventors: Philippe Dollo, Lannion (FR); Yannick Stephan, Tregastel (FR)

(73) Assignee: Alcatel, Paris (FR)

( * ) Notice: Subject to any disclaimer, the term of this patent is extended or adjusted under 35 U.S.C. 154(b) by 929 days.

(21) Appl. No.: 11/453,795

(22) Filed: Jun. 16, 2006

(65) Prior Publication Data

US 2007/0002901 A1 Jan. 4, 2007

(30) Foreign Application Priority Data

Jun. 17, 2005 (FR) ..................... 05 51653

(51) Int. Cl.
*H04J 3/24* (2006.01)
(52) U.S. Cl. ........ 370/473; 370/474; 370/475; 370/476; 370/392; 370/393; 370/394; 370/389; 370/907
(58) Field of Classification Search .................. 370/473, 370/474, 475, 476, 392, 393, 394, 389, 907
See application file for complete search history.

(56) References Cited

U.S. PATENT DOCUMENTS

| | | | | |
|---|---|---|---|---|
| 7,161,961 | B2 * | 1/2007 | Barker et al. | 370/476 |
| 7,359,964 | B2 * | 4/2008 | Roe et al. | 709/224 |
| 2003/0056017 | A1 * | 3/2003 | Gonda | 709/251 |
| 2006/0067314 | A1 * | 3/2006 | Ho et al. | 370/389 |
| 2006/0153179 | A1 * | 7/2006 | Ho et al. | 370/386 |

OTHER PUBLICATIONS

Alexander V. et al: "TDM Circuit Emulation Service over Packet Switched Network (CESoPSN) draft-vainshtein-cesopsn-02.txt" Aug. 2002, XP015005576.
Turner, R. B.: "Legacy Telecom hits the 21st Century: TDM circuits on Advanced TCA Switch Fabrics." May 2005, pp. 1-3, XP002367751.
Y(J) Stein et al: "TDM over IP." vol. pwe3, No. 3, Feb. 2005, XP015026066.
Malis A. G.: "SONET/ SDH Circuit Emulation over Packet (CEP)." vol. pwe3, No. 10, Feb. 2005, XP015026059.
Vainshtein-Editor et al: "Unstructured TDM Circuit Emulation Service over Packet Switched Network." Oct. 2002, XP015005580.

* cited by examiner

*Primary Examiner* — Huy D Vu
*Assistant Examiner* — Kibrom T Hailu
(74) *Attorney, Agent, or Firm* — Carmen Patti Law Group, LLC

(57) ABSTRACT

Apparatus (D1) is dedicated to processing STM-n/STS-m type data frames in a communications network. It comprises at least one STM-n/STS-m interface unit (LIU1) adapted to receive STM-n/STS-m type data frames from a communications network and processor means (MTj) adapted, on receiving data from an STM-n/STS-m frame coming from said line interface unit (LIU1): i) to segment the whole of said received frame into m groups of p successive bytes; ii) then to associate with each group a control header containing data representing its position within the STM-n/STS-m frame; and iii) to encapsulate each group and the associated control header in a payload data field of an Ethernet frame.

20 Claims, 1 Drawing Sheet

ENCAPSULATION OF STM-N/STS-M FRAMES UNDER ETHERNET

Figure 1:
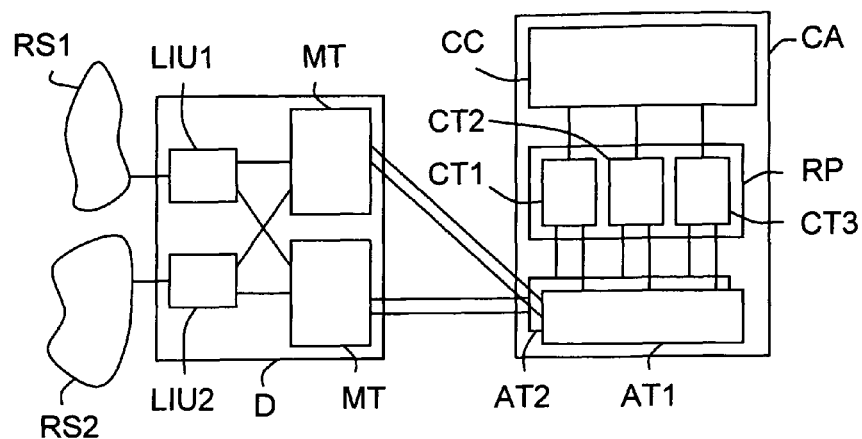

The invention relates to transport networks and more particularly to interconnecting SDH/SONET (Synchronous Digital Hierarchy/Synchronous Optical NETwork) type synchronous transport networks and asynchronous transport networks.

As the person skilled in the art is aware, to each type of transport network there corresponds at least one type of data transport frame. Thus in SDH/SONET type synchronous networks SDH data is transmitted in STM-n (Synchronous Transport Module-n) frames and SONET data is transmitted in STS-m (Synchronous Transport Signal-m) frames whereas in asynchronous networks data may be transmitted in the form of Ethernet frames.

For networks of different types to be able to exchange their respective frames, it is essential to provide in their connection interfaces equipment capable of transforming at least some of the frames received from a network of a given type into frames understandable to and transportable by a network of another type without losing information (for example by encapsulating them).

Thus it has been proposed to transport payload data contained in VC-4 or VC-12 fields of STM-n/STS-m frames coming from an SDH/SONET synchronous network and going to an asynchronous network by integrating them into the portion of Ethernet frames dedicated to payload data. This technique is generally referred to as "Transport over Ethernet". It is described in particular in documents issued by IETF working group PWE3.

A drawback of this technique is that the Ethernet frames transmit only the payload data of the STM-n/STS-m frames and not the frame headers (also known as the overhead) or the timing associated with the frames. Consequently, it is not possible to terminate in the same network equipment STM-n/STS-m frames of different types, i.e. frames coming from networks of different types.

The Transport over Ethernet technique is also incompatible with the use of some functions offered by some recent architectures, such as the aTCA architecture. The aTCA architecture offers telecommunications equipment modularity but does not offer independence of STM-n/STS-m line protection (known as automatic protection switching (APS)) and line termination board protection (known as equipment protection switching (EPS)).

Thus one object of the invention is to improve upon this situation and in particular to enable transport over Ethernet of STM-n/STS-m frames in an aTCA architecture, for example.

To this end it proposes apparatus for use in a communications network for processing STM-n/STS-m type data frames, comprising at least one STM-n/STS-m line (or connection) interface unit adapted to receive STM-n/STS-m type data frames from a communications network and processor means adapted on receiving data from an STM-n/STS-m frame coming from said line interface unit to segment the whole of the received frame into m groups of p successive bytes, then to associate with each group a control header containing data representing its position within the STM-n/STS-m frame, and to encapsulate each group and the associated control header in a payload data field of an Ethernet frame.

The apparatus of the invention may have other features and in particular, separately or in combination:

its processor means may be adapted firstly to perform said segmentation as and when STM-n/STS-m frame data is received, secondly to associate a control header with a group as soon as that group has been formed by said segmentation, thirdly to encapsulate a group and the associated control header in an Ethernet frame as soon as said header has been associated with that group, and fourthly to transmit the resulting m Ethernet frames successively at a given period;

the number m of groups may be equal to 9 and the number p of bytes in each group is equal to 270;

its processor means may be adapted to place in an information field of said Ethernet frames (for example the "Type" field) data indicating that their payload data field contains a portion of an encapsulated STM-n/STS-m frame; and the Ethernet frames may contain data representing negative or no or positive justification (stuffing) information:

the control header may comprise one or more stuffing bits representing negative justification information;

each group of p bytes may comprise one or more stuffing bits representing positive justification information; and the control header may contain control data representing the stuffing bits.

The invention also provides frame switching equipment for use in an asynchronous communications network, comprising:

at least one Ethernet frame switch having at least one input adapted to receive Ethernet frames in which STM-n/STS-m frames have been encapsulated by means of a processor apparatus of the above type and to switch each received Ethernet frame to an output selected from at least two outputs as a function of a destination port designated in the header of said received Ethernet frame; and at least two STM-n/STS-m logical line termination boards of different types, having different destination ports and each being fed with encapsulated frames by one of said outputs of each frame switch and adapted to extract from the received Ethernet frames the groups of p bytes that they contain in order to reconstitute STM-n/STS-m frames from ordered series of m groups resulting from their previous segmentation.

Figure 2:
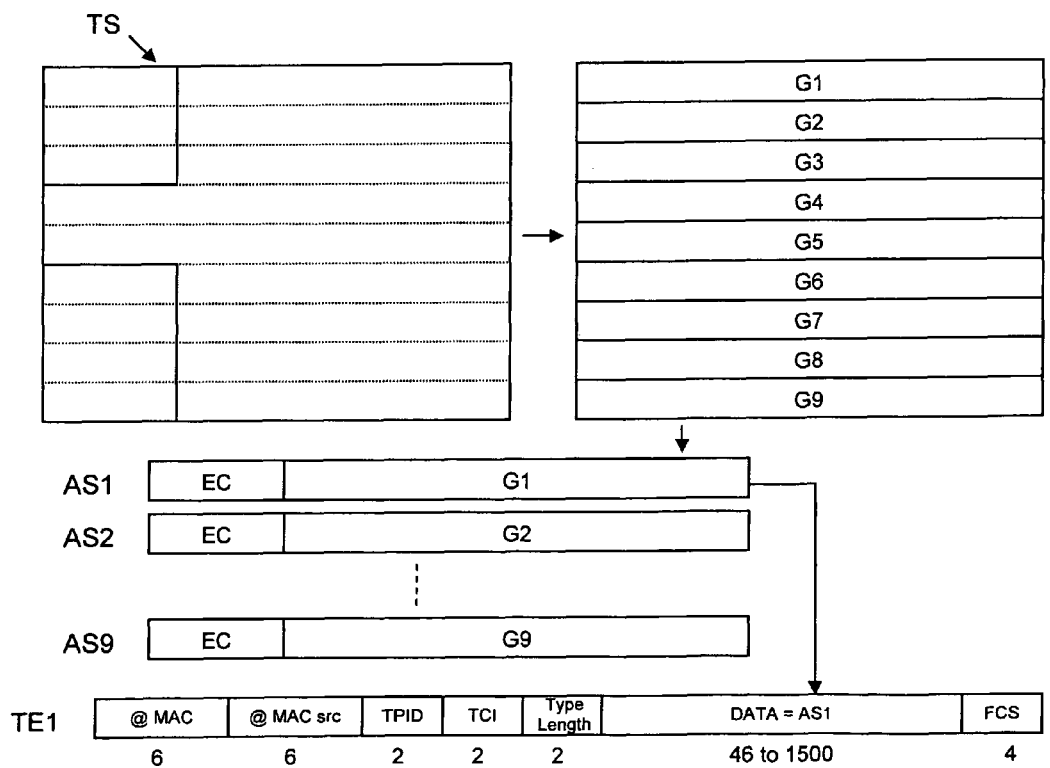

Other features and advantages of the invention become apparent on reading the following detailed description and examining the appended drawings, in which:

FIG. 1 is a functional block diagram of one embodiment of an STM-n/STS-m line termination equipment provided with STM-n/STS-m frame processor apparatus of the invention and one embodiment of a frame switching equipment of the invention; and FIG. 2 is a diagram of the main steps of encapsulating an STM-n/STS-m frame under Ethernet in accordance with the invention.

The appended drawings constitute part of the description of the invention and may, if necessary, contribute to the definition of the invention.

One object of the invention is to enable transport over Ethernet of STM-n/STS-m type data frames coming from an SDH/SONET type synchronous transport network, where applicable in an aTCA architecture.

The data frames to be transported over Ethernet considered below by way of non-limiting example are STM-1 type frames. The invention is not limited to this type of frame alone, however. It relates to all STM-n or STS-m type frames, where n and m are positive integers, coming from an SDH or SONET type synchronous transport network or from a PLMN or a UTRAN type, in particular STS-3, STM-4 and STS-12 frames.

It is further considered below, by way of non-limiting example, that the STM-1 frames come from SDH type synchronous networks, possibly connected to a PLMN or a UTRAN network. However, the STM-1 frames could come from networks of other types, in particular from a Packet over SONET type asynchronous network.

FIG. 1 is a functional block diagram of a first network equipment D coupled to two SDH networks RS1 and RS2 and a second network equipment CA coupled to the first network equipment D.

The first network equipment D is STM-1 frame processor apparatus of the invention, also referred to as an auxiliary shelf. In this example the processor apparatus D physically terminates STM-1 lines coming from the SDH networks RS1 and RS2 and encapsulates STM-1 frames that it receives in Ethernet transport frames. To this end, it includes at least one STM-1 line interface unit LIUi coupled to at least one processor module MTj.

The number of STM-1 line interface units LIUi depends on the number of networks connected to the processor apparatus D. Here that number is 2 (i=1 or 2) but may take any positive integer value (i>0). Moreover, the number of processor modules MTj depends on the number of Ethernet frame switches ATj installed in the second network equipment CA (see below). Here this number is 2 (j=1 or 2) but may take any positive integer value (j>0). For example, the second processor module MT2 is a redundant module for backing up the first processor module MT1 in the event of problems. In this case, the second processor module MT2 is on standby (inactive) when the first processor module MT1 is operating (active).

The second network equipment CA is an aTCA rack, for example. In this example the rack CA of the invention logically terminates STM-1 lines, where applicable as a function of the types of STM-1 frames that they carry. It may be connected to an Internet Protocol (IP) network in order to communicate to it voice data extracted from STM-1 frames encapsulated in the Ethernet frames it receives. It is important to note that the invention is not limited to aTCA type architectures.

The rack CA includes at least one Ethernet frame switch ATj, one network equipment RP that is coupled to each frame switch ATj and is generally called a main shelf, and a control and switching board CC coupled to the main shelf RP.

Each line interface is a line interface unit (LIU), for example. In this example it terminates physically (rather than logically) STM-1 lines (or connections) coming from the SDH network to which it is connected. Here the expression "terminates STM-1 lines physically" refers to converting optical signals into electrical signals (or electrical signals into other electrical signals i.e. signal adaptation) in a manner that is transparent for data contained in the STM-1 frames.

Each line interface unit LIUi preferably has a number of outputs equal to the number of STM-1 frame processor modules MTj in the processor apparatus D. Thus it can feed STM-1 frames it receives either to the first STM-1 frame processor module MT1 or to the (redundant) second processor module MT2.

According to the invention, when it receives data of an STM-1 frame from a line interface unit LIUi, each processor module MTj (j=1 or 2) segments the frame into m groups of p successive bytes.

The number m of groups may be equal to 9 and the number p of bytes in each group may be equal to 270, for example. Other values may be chosen for the parameters m and p, of course. These values in fact depend, among other things, on the number of bytes that an STM-n or STS-m frame to be encapsulated contains. The values 9 and 270 for m and p, respectively, are particularly well adapted to STM-1 frames because they take the form of 270 columns of 9 lines (rows), each row in a column containing a (data) byte, as shown in part in the top left-hand portion of FIG. 2 (which is a diagram of an STM-1 frame TS).

It is important to note that segmentation takes account of all the data (or bits) contained in an STM-1 frame TS. The top right-hand portion of FIG. 2 gives one example of the segmentation of an STM-1 frame TS into nine groups G1 to G9 of 270 (p) bytes.

The processor module MTj also associates a control header EC with each group resulting from segmentation. The control header EC contains at least data representing the number of the group Gk in its source frame (here k=1 to m). The control header EC comprises eight bytes, for example.

Moreover, because each STM-1 synchronous frame has to be transmitted in m asynchronous Ethernet frames TEk, the control headers EC preferably contain data representing positive justification, no justification or negative justification (stuffing) information, in order for transport over Ethernet of the STM-1 frames to the rack CA to be error-free. To this end, each control header EC is preferably placed in front of the group Gk of bytes with which it is associated.

Justification uses four bits C1, C2, S1 and S2, for example. Two of these four bits are a negative stuffing bit (S1) and a positive stuffing bit (S2) for compensating frame timing respectively below or above the reference timing. The other two bits are control bits (C1 and C2) for signaling if the other two justification bits are negative or positive stuffing bits or not, respectively.

For example, the control header EC preferably contains the two control bits C1 and C2 and the negative justification stuffing bit S1, preferably at the end of the header and in the order C1, C2, S1. The positive justification stuffing bit S2 is preferably placed just after S1, i.e. in the first position in the first of the p bytes of each group Gk.

The invention enables justification because the whole of the STM-1 frame is encapsulated in m Ethernet frames and information relating to timing can therefore be transported.

Associating a control header EC with a group Gk yields a block Ask (k=1 to m). The middle portion of FIG. 2 gives one example of the association of a control header EC with nine groups G1 to G9 resulting from segmenting an STM-1 frame TS to yield nine blocks AS1 to AS9.

It is important to note that the p(270) bytes that constitute one of the m (9) groups Gk do not necessarily belong to the same row of an STM-1 frame (although this is the case in the FIG. 2 non-limiting example). They may "float" and therefore belong to successive rows, in particular if the data from the frames is processed on the fly.

The processor module MTj also encapsulates each block Ask consisting of a control header EC and a group Gk of bytes in the field of an Ethernet frame TEk dedicated to payload data. The block AS1 is encapsulated in an Ethernet frame TE1, the block AS2 is encapsulated in an Ethernet frame TE2, and so on up to the block AS9, which is encapsulated in an Ethernet frame TE9.

The lower portion of FIG. 2 shows one example of an Ethernet frame TE1 whose payload data field (DATA) contains the encapsulated first block AS1. The numbers under the fields constituting the Ethernet frame indicate the respective numbers of bytes that they contain. Note that the resulting Ethernet frame TEk is a perfectly standard frame. Its "Type" field preferably contains data that indicates that the data contained in the subsequent DATA field constitutes a portion of an STM-1 frame.

The data of a received STM-1 frame is preferably processed by the processor module MTj as and when it arrives rather than after it has all been received. To be more precise, the processor module MT segments an STM-n/STS-m frame as and when its data is received ("on the fly"). As soon as the first 270 bytes have been received the processor module MT groups them into a first group G1 with which it then associates a control header EC in order to constitute a first block AS1 that it encapsulates in the DATA field of a first Ethernet frame TE1 ready to be transmitted to the aTCA rack CA. It then repeats the same steps with the next 270 bytes to constitute a second Ethernet frame TE2 ready to be transmitted to the aTCA rack CA, and so on up to a ninth Ethernet frame TE9 containing the last 270 bytes of the STM-1 frame received.

The m Ethernet frames TEk (k=1 to 9) that transport all the data from an STM-1 frame are preferably transmitted successively with a given period, for example every 125/m μs. Thus a complete STM-1 frame can be transmitted to the aTCA rack CA in 125 μs by nine Ethernet frames TE1 to TE9.

The Ethernet frames TEk are transmitted by the processor apparatus D to the frame switch ATj coupled to the processor module MTj that constructed them.

The frame switch ATj switches to the main shelf RP frames that it receives at each of its inputs coupled to apparatus Dj.

The main shelf RP includes at least one STM-1 frame termination board CT1. In the example shown in FIG. 1, the main shelf RP includes three STM-1 frame termination boards CT1 to CT3 (I=1 to 3) dedicated to logical termination of STM-1 frames of different types. For example, the STM-1 frame termination board CT1 is dedicated to STM-1 frames containing channelized payload data corresponding to TDM (time division multiplexing) applications, the STM-1 frame termination board CT2 is dedicated to STM-1 frames containing unchannelized payload data corresponding to ATM (asynchronous transfer mode) applications, and the STM-1 frame termination board CT3 is dedicated to STM-1 frames containing unchannelized payload data corresponding to Packet over SONET type applications. Redundant boards may be provided to back up the CTI boards.

Each STM-1 frame termination board CTI logically terminates one type of STM-1 line that carries payload data of the type to which it is dedicated. Here the expression "logically terminates an STM-1 line" refers to extracting the data encapsulated in the Ethernet frames in order to process it as a function of its header data. Logical termination consists in extracting 64 kilobits per second (kbps) voice channels from STM-1 frames.

Because it enables transport over Ethernet of all the data contained in STM-n/STS-m frames, not just the payload data, as is the case with prior art network equipments, the invention offers the option of using a plurality of termination boards CTI in parallel.

If the main shelf RP includes a plurality of (at least two) frame termination boards CTI, as is the case here, each frame switch ATj comprises a plurality of outputs each coupled to one of said boards CTI. Accordingly, each time that a frame switch ATj receives an Ethernet frame TEk, it determines the STM-1 frame termination board for which it is intended as a function of the destination port that it designates. It then remains only to deliver the Ethernet frame TEk to the output coupled to the STM-1 frame termination board CTI that has the destination port determined in this way.

When an STM-1 frame termination board CTI receives an Ethernet frame TEk it extracts the block Ask from its DATA field. It then uses the information contained in the control header EC of the block Ask to determine the number of the group Gk that it contains (the group number is a row number if the p bytes of a group Gk comprise all the bytes of one of the rows of an STM-1 frame). The STM-1 frame termination board CTI can thus reconstitute the whole of an STM-1 frame initially received via one of the line interface units LIUi of the auxiliary shelf RA and encapsulated in m Ethernet frames by one of the apparatuss Dj of the same auxiliary shelf RA by combining the m groups that constitute a STM-1 frame (here m=9).

The data contained in the reconstituted STM-1 frames can either be used locally or transmitted (at least in part) to a communications network. For example, the rack CA may include an Internet Protocol board connected to its frame switches ATj for Voice over IP (VOIP) transmission to an Internet Protocol (IP) network to which it is connected, the voice signal being initially contained in the voice channels of the STM-1 frames (for example 64 kbps channels). In this case, the voice channels are extracted by one of the STM-1 frame termination boards CTI and forwarded to one of the frame switches ATj which in turn forwards them to the IP board.

The control and communications board CC enables exchange of data and/or information between STM-1 frame termination boards CTI of different main shelves in the rack CA.

The processor apparatus Dj of the invention and in particular its processor module MT may take the form of electronic circuits, software (or electronic data processing) modules or a combination of circuits and software.

The invention may be implemented in equipment with a switching architecture based on Ethernet switches, for example voice media gateways (MGW), base station controllers (BSC), radio network controllers (RNC) or nodes of the SGSN or GGSN type.

Because of the invention, in an aTCA type architecture (which is not limiting on the invention), the lines may be physically terminated in frame processor apparatus D (or auxiliary shelf) other than the main shelf and external to the rack that contains the main shelf. The functions provided by the aTCA architecture can therefore be offered, for example independence of line protection (automatic protection switching (APS) provided by the processor apparatus D (or auxiliary shelf)) and line termination board protection (equipment protection switching (EPS) provided by the main shelf RP).

The invention is not limited to the processor apparatus, STM-n/STS-m line termination equipment and frame switching equipment embodiments described hereinabove by way of example only and encompasses any variants that the person skilled in the art might envisage that fall within the scope of the following claims.

Thus an embodiment of the invention is described hereinabove in relation to STM-1 frames coming from an SDH network. The invention is not limited to that type of frame or to that type of network, however. It relates to the encapsulation under Ethernet of any STM-n or STS-m type frames coming from an SDH or SONET type synchronous transport network, for example, in particular STS-3, STM-4 and STS-12 frames.

What is claimed is:

1. An apparatus for use in a communications network for processing at least one of an STM-n (Synchronous Transport Module-n) and STS-m (Synchronous Transport Signal-m) type data frames, wherein the apparatus comprises at least one of an STM-n and STS-m line interface unit operable to receive STM-n and STS-m type data frames from a communications network and processor means operable to receive data from at least one of an STM-n and STS-m frame coming from said line Interface unit to:

i) segment the whole of said received frame into m groups of p successive bytes, wherein each group comprises payload data and overhead of the received frame;

ii) generate for each group an associated control header containing data that represents a position of each group within the at least one of an STM-n and STS-m frame; and iii) encapsulate each group and the associated control header in a payload data field of an Ethernet frame wherein timing information is transported with the payload data field.

2. The apparatus according to claim 1, wherein said processor means are operable to:
i) perform said segmentation when the at least one of an STM-n and STS-m frame data is received;
ii) associate a control header with a group as soon as the group has been formed by said segmentation;
iii) encapsulate the group and the associated control header in the Ethernet frame as soon as said control header has been associated with the group; and
iv) atoll continue to segment and associate a control header with an Ethernet frame until m Ethernet frames are created; and to transmit the resulting m Ethernet frames successively at a given period.

3. The apparatus according to claim 1, wherein m is equal to 9 and p is equal to 270.

4. The apparatus according to claim 1, wherein said Ethernet frame contains data that represents negative justification, no justification, or positive justification information.

5. The apparatus according to claim 4, wherein said control header comprises one or more stuffing bits that represents negative justification information.

6. The apparatus according to claim 4, wherein each group of p bytes comprises one or more stuffing bits that represent positive justification information.

7. The apparatus according to claim 5, wherein each group of p bytes comprises one or more stuffing bits that represent positive justification information, and wherein said control header contains control data that represents said stuffing bits.

8. The apparatus according to claim 1, wherein said processor means are operable to place in an information field of said Ethernet frame data that indicates that their payload data field contains a portion of an encapsulated the at least one of an STM-n and STS-m frame.

9. The apparatus according to claim 8, wherein said information field is the "Type" field.

10. Frame switching equipment for use in an asynchronous communications network, wherein said frame switching equipment comprises:
at least one Ethernet frame switch that has at least one input operable to receive Ethernet frames in which m groups of p successive bytes and their generated corresponding control headers that represent positions of the m groups of at least one of an STM-n (Synchronous Transport Module-n) and STS-m (Synchronous Transport Signal-m) frame has been encapsulated in payload field of the Ethernet frames, wherein each of the m groups of the p successive bytes of the at least one of an STM-n and STS-m frame comprises payload data and overhead data, and wherein timing information is transported with the payload data, and wherein said frame switching equipment is operable to switch each received Ethernet frame to an output selected from at least two outputs; and
wherein the frame switching equipment is configured to switch each received Ethernet frame as a function of a destination port address designated in the control header of the Ethernet frame.

11. The apparatus of claim 10, wherein the frame switching equipment further comprises at least one STM-n and STS-m logical line termination board where each of the at least one STM-n and STS-m logical line termination board comprises:
a unique destination port address; and
is configured to the extract from the received Ethernet frames the groups of p bytes comprising the received Ethernet frames to reconstitute at least one of an STM-n and STS-m frame.

12. The apparatus of claim 11, wherein the at least one STM-n and STS-m logical line termination board comprises at least one of a line termination board dedicated to channelized data.

13. The apparatus of claim 12, wherein the at least one line termination board receives Ethernet frames in parallel from the at least one frame switching equipment.

14. A telecommunications equipment apparatus configured to:
segment at least one of an STM-n (Synchronous Transport Module-n) and STS-m (Synchronous Transport Signal-m) frame into m groups of p successive bytes where each group comprises payload data and overhead of the at least one of an STM-n and STS-m frame;
generate for each group an associated control header containing data that represents a position of a group within the at least one of an STM-n and STS-m frame; and
encapsulate each group and the associated control header in a payload field of an Ethernet frame wherein timing information is transported with the payload field.

15. The apparatus of claim 14, wherein the telecommunications equipment further comprises at least one communications network processor operable to receive the at least one of an STM-n and STS-m frame and communicate the Ethernet frame to at least one Ethernet frame switch, the at least one Ethernet frame switch being operable to receive the Ethernet frame and communicate the Ethernet frame to at least one of an STM-n and STS-m logical line termination board, and the at least one of an STM-n and STS-m logical line termination board configured to receive the Ethernet frame; and
wherein the at least one communications network processor is communicatively coupled with the at least one Ethernet frame switch, and wherein the at least one Ethernet frame switch is communicatively coupled with the at least one of an STM-n and STS-m logical line termination board; and
wherein the at least one communications network processor is configured to communicate the Ethernet frame to the at least one Ethernet frame switch; and
wherein the at least one Ethernet frame switch switches the Ethernet frame to the at least one of an STM-n and STS-m logical line termination board as a function of a destination port address designated in a header of the Ethernet frame.

16. The apparatus of claim 15, wherein the at least one communications network processor communicates the at least one of an STM-n and STS-m frame in an approximately 125 micro second time frame.

17. The apparatus of claim 15, wherein the at least one Ethernet frame switch is configured to communicate in parallel at least one Ethernet frame to the at least one STM-n and STS-m logical line termination board.

18. The apparatus of claim 15, wherein the at least one Ethernet frame switch and the at least one STM-n and STS-m logical line termination board reside in an aTCA rack.

19. The apparatus of claim 15, wherein the control header comprises a plurality of stuffing bits that represents justification information where the justification information is at least one of negative justification, positive justification and no justification.

20. The apparatus of claim 1, wherein the control header and the overhead are different.

* * * * *